A. REYNOLDS.
WEIGHING MACHINE.
APPLICATION FILED MAR. 4, 1920.

1,410,957.

Patented Mar. 28, 1922.
4 SHEETS—SHEET 1.

INVENTOR
Albert Reynolds
BY John A. Nasmith
HIS ATTORNEY

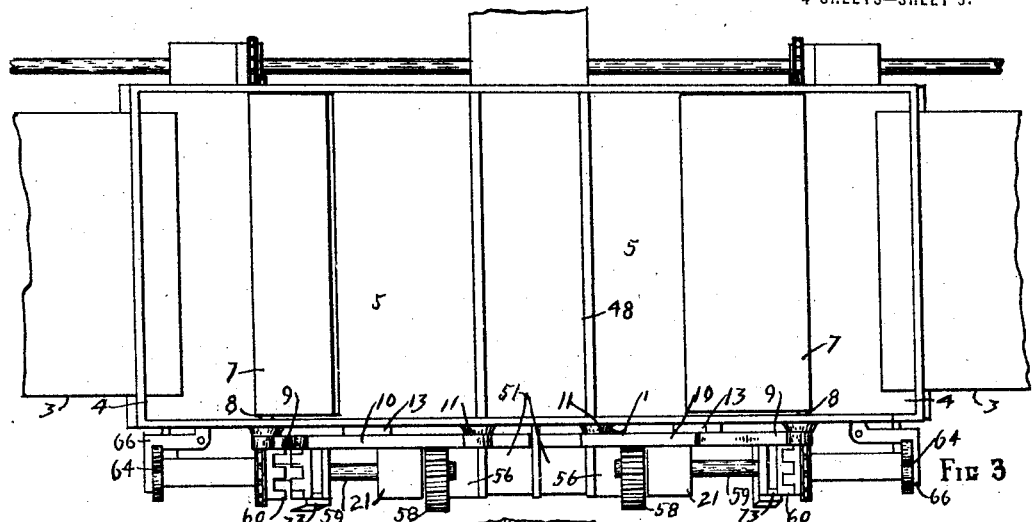

A. REYNOLDS.
WEIGHING MACHINE.
APPLICATION FILED MAR. 4, 1920.

1,410,957.

Patented Mar. 28, 1922.
4 SHEETS—SHEET 4.

INVENTOR
Albert Reynolds
BY John A. Naismith
HIS ATTORNEY

UNITED STATES PATENT OFFICE.

ALBERT REYNOLDS, OF SAN JOSE, CALIFORNIA.

WEIGHING MACHINE.

1,410,957.  Specification of Letters Patent.  Patented Mar. 28, 1922.

Application filed March 4, 1920. Serial No. 363,246.

*To all whom it may concern:*

Be it known that I, ALBERT REYNOLDS, a subject of the King of Great Britain, and residing in San Jose, in the county of Santa Clara and State of California, have invented certain new and useful Improvements in Weighing Machines, of which the following is a specification.

My invention relates to a machine for automatically weighing out given quantities of material at uniform intervals from a continuously feeding supply.

It is the object of my invention to provide a weighing machine that will automatically deposit an approximately correct amount of the material to be weighed in a scale hopper, feed gradually into said hopper an additional amount of the material until the required weight is reached, and automatically discharge the weighed material from said hopper. It is an object of my invention to provide a means whereby to prevent the placing of the approximately correct amount of material in the hopper from operating the scale beam. It is another object of my invention to provide a mechanism whereby a plurality of the weighing machines may be operated successively by independent devices operating in conjunction with the receiver of the weighed material. It is a further object of my invention to provide a novel form of tripping mechanism operated by the movement of the scale bar. Finally an object of my invention is to provide a weighing machine that will be automatic, positive and accurate in its practical application and adapted for use with any material, including dried and freshly processed fruits.

In the drawings:—

Figure 3 is a top plan view of the machine shown in Figure 2.

Figure 4 is a sectional view of the machine shown in Figure 2 and on line 4—4 thereof.

Figure 5 is a detail illustration showing how certain parts of the machine are operated by means of containers or receptacles passing thereunder.

Figure 1:
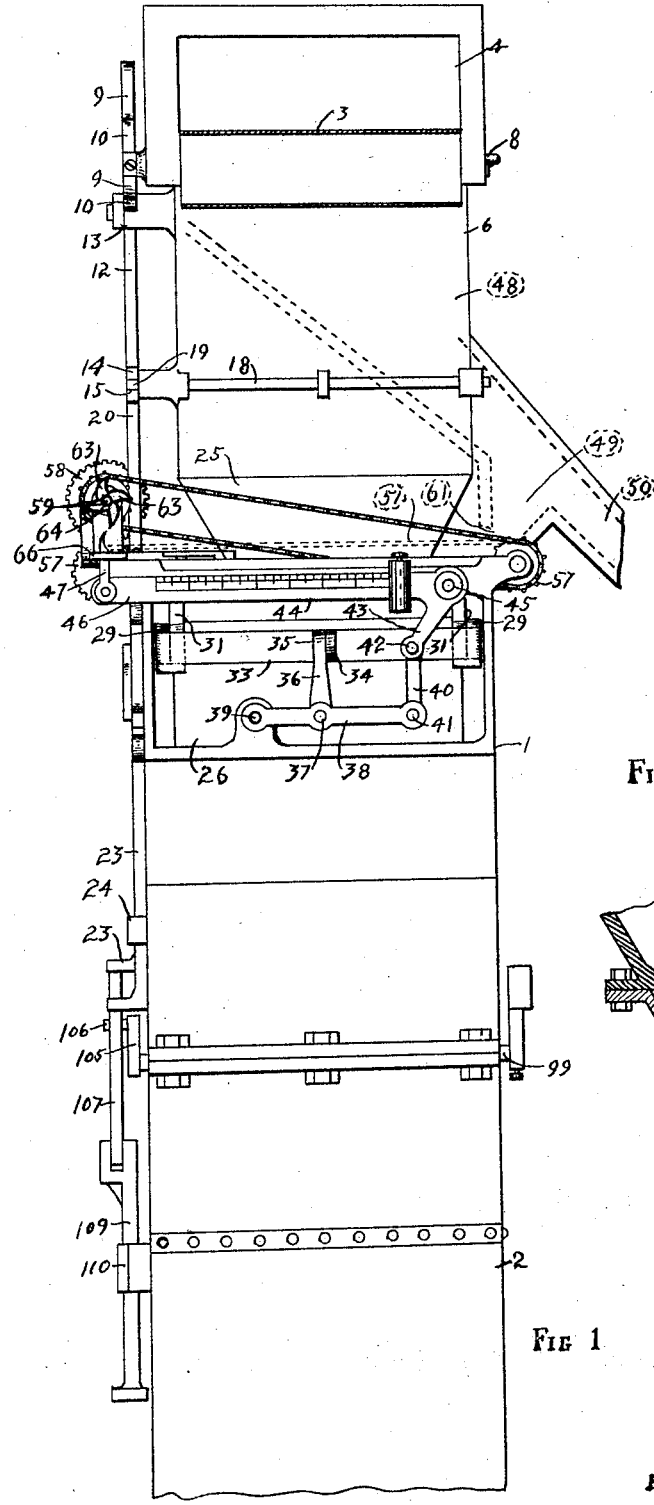
Figure 1 is a front elevation of my improved weighing machine.
Figure 9:
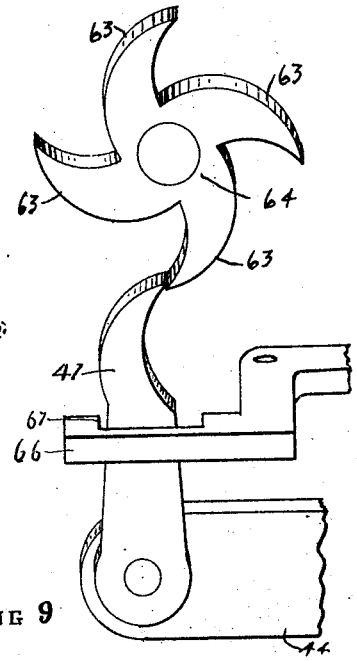
Figure 9 is a detail illustration of a portion of the tripping mechanism.

The machine hereinafter described consists of two complete units identical in construction and operation, therefore the following description will apply equally as well to both of them, the two units being mounted upon a single frame 1 and having a discharge chute 2 common to both of them.

Each unit comprises a conveyor belt 3 discharging into a chute 4 provided with an opening 5 in the bottom thereof communicating with chamber 6. At 7 is shown a gate hinged at 8 and normally closed down over about one-half of opening 5 and carrying an arm 9 positioned on the exterior of chute 4 but operating as an integral part of gate 7. At 10 is another arm pivotally mounted on the exterior of chute 4 as shown at 11 and having its free end contacting with the free end of arm 9.

At 12 is a vertically slidable rod mounted in bearing 13 on chamber 6, its upper end being in contact with the under side of arm 10 and its lower end being attached to cross bar 14 provided with terminal slots 15. At 16 are a pair of doors pivotally mounted on the bottom of chamber 6 as at 17—17 and normally in a closed position so as to form a bottom to said chamber. Each door has extensions 18 provided with pins 19 engaging slots 15 in cross-bar 14. Extending downwardly from bar 14 and in alignment with rod 12 is a push rod 20 operating in bearing 21 on frame 1. At 22 is a horizontally positioned arm lying parallel with the side of frame 1 and carried by a vertically movable push rod 23 operating in bearings 24 on frame 1. An upward movement of push rod 23 operates to raise gate 7 and open doors 16 whereas a downward movement of the same drops gate 7 and closes doors 16.

At 25 is a chute positioned directly under chamber 6 and rigidly mounted on frame 1 to direct material discharged from chamber 6 into scale hopper 26. Scale hopper 26 is pivotally suspended as at 28 on arms 29, the latter being pivotally connected as at 30 to links 31 which are in turn pivotally connected as at 32 to frame 1 of the machine. Arms 29 are connected by cross bar 33 from which projects an arm 34, the free end of arm 34 being pivotally connected as at 35 to a link 36 which is in turn pivotally connected at 37 to lever 38 of the weighing scales, lever 38 being pivotally connected to frame 1 at one end 39 and to a link 40 at the other end 41. The link 40 is pivotally connected at its upper end 42 to arm 43 of scale beam 44 which is pivoted to frame 1 at 45. A downward movement of hopper 26 operates to raise the free end 46 of scale beam 44 and the tripping pin 47 carried thereby, the function of this tripping pin 47 being hereinafter described.

The amount of material dropped into hopper 26 from chamber 6 is something less than the net weight required, the balance of the material being fed into the hopper in the following manner.

At 48 is a chute receiving the overflow from chamber 6, this overflow being carried by the bottom of chute 48 to hopper 49, this hopper overflowing at 50 into any suitable receiver. At 51 is a belt having substantially the same width as hopper 49 and mounted on rollers 52 and 53, the former being revolubly mounted in bearing 54 in frame 1 and the latter being mounted on shaft 55 revolubly mounted in bearings 56 in frame 1 and driven by gear 57 meshing with gears 58, the latter being mounted on shaft 59 which is driven by any suitable driving mechanism not shown through the medium of clutch 60. The belt 51 passes through an opening 61 in hopper 49, the said opening being just large enough to permit the passage of a very small quantity of material therethrough, this material being removed from the belt and caused to drop through chute 25 into weighing hopper 26 by diverting members 62. The moment the exact weight is reached and scale bar 44 moves upward the tripping pin 47 is engaged by one of the teeth 63 on pinion 64 on shaft 65 and jerked outwardly. At 66 is shown a bell crank mounted on frame 1 and provided with a slot 67 through which tripping pin 47 passes and which is operated by the movement of said tripping pin to withdraw bar 68 slidably mounted in bearing 69 on frame 1 thereby releasing catch 70 forming an integral part of arm 71, the latter being pivotally mounted on frame 1 at 72, engaging clutch 60 at 73 and pivotally connected to link 74 at 75. The other end of link 74 is pivotally connected to lever 76 at 77, the lever 76 being pivotally mounted on frame 1 at 78 and having an outwardly extending arm 79 which is in engagement with and supports arm 22 of push rod 23 while the full weight is being secured in hopper 26. The moment bar 68 is withdrawn from engagement with catch 70 the weight of arm 22 and push rod 23 pulls lever 76 downward and throws out catch 60 thereby instantly stopping the flow of material into hopper 26.

The clutch is again thrown into operation in the following manner. When arm 22 and push rod 23 are moved upward as hereinafter described it moves upwardly past the lower arm of bell crank 80 which is pivoted on frame 1 at 81, the end of said arm having a catch 82 pivotally mounted thereon at 83 and so formed and weighted as to swing freely to permit arm 22 to pass thereby on its upward movement but to catch and hold the same on its downward movement. The initial downward movement of arm 22 is not arrested but serves to operate bell crank 80 the longer arm of which engages arm 71 at 88 and operates to move arm 71 and link 74 to throw in the clutch 60 and raise arm 79 of lever 76 to a position to receive arm 22 of push rod 23 and support the same. The moment the clutch 60 is thrown in bar 68 is thrown into engagement with catch 70 by means of spring 89.

The bottom doors 90 of hopper 26 are also opened by the downward movement of arm 22 on push rod 23. The end of arm 22 is made sufficiently wide to engage not only catch 82 and arm 79 of lever 76 but to also engage the upper end of bar 91 which is provided with end slots 93 engaging pins 94 on levers 95 forming an integral part of doors 90 which are hinged at 96. The doors are normally held in a closed position by means of spring 97 mounted on hopper 26 as at 98, but when arm 22 moves downward cross bar 92 is forced downward and the doors 90 opened against the spring 97.

More briefly stated the operation of the machine is as follows.

The material is fed into chute 4 continuously by belt 3, the incoming material forcing the material in advance over gate 7 into chamber 6, the overflow from each chamber 6 falling down into hopper 49 of which the belt 51 forms the bottom. At the proper moment push rod 23 is forced upwardly, the arm 22 engaging rod 20 and simultaneously opening doors 16 and raising gate 7 to stop the flow of material which is banked up behind said gate by belt 3.

Immediately arm 22 has reached its highest point it begins to descend thereby operating bell crank 80 to throw in clutch 60 and set belt 51 into motion, the said arm 22 being caught and held after descending a little ways by arm 79 and bar 68 and connecting parts. This preliminary downward movement of arm 22 also allows rods 12 and 20 to drop thereby again closing gate 7 and doors 16.

The charge of material dropped from chamber 6 falls into hopper 26 and the moving belt 51 carries a small amount of material through opening 61, the same being gradually fed into hopper 26 until the weight desired is reached, causing the hopper 26 to descend.

The descent of hopper 26 causes tripping pin 47 to engage the revolving pinion 64 thereby releasing catch 70 and allowing arm 22 to descend its full distance. The downward movement of arm 22 operates to disengage clutch 60 and stop belt 51, it engages rod 91 and opens doors 90 and allows the material weighed to drop into chute 2. Upon again raising push rod 23 and arm 22 this cycle of operations is repeated.

Inasmuch as this particular embodiment of my invention is designed to operate in connection with the packaging machine set forth in my copending application, or with moving receptacles as hereinafter described, a double machine is herein shown with adjacent and parallelly positioned push rods as shown. In the present case these push rods are operated alternately in the following manner.

Figure 8:
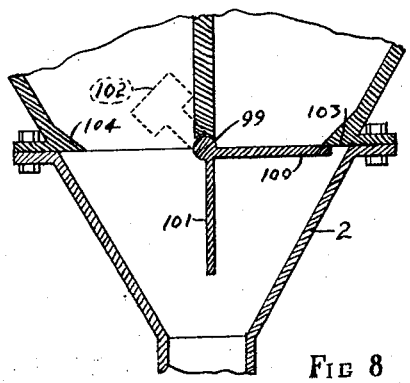
Figure 8 is a detail sectional view of the selective device used in conjunction with a pair of weighing machines.
Figure 2:
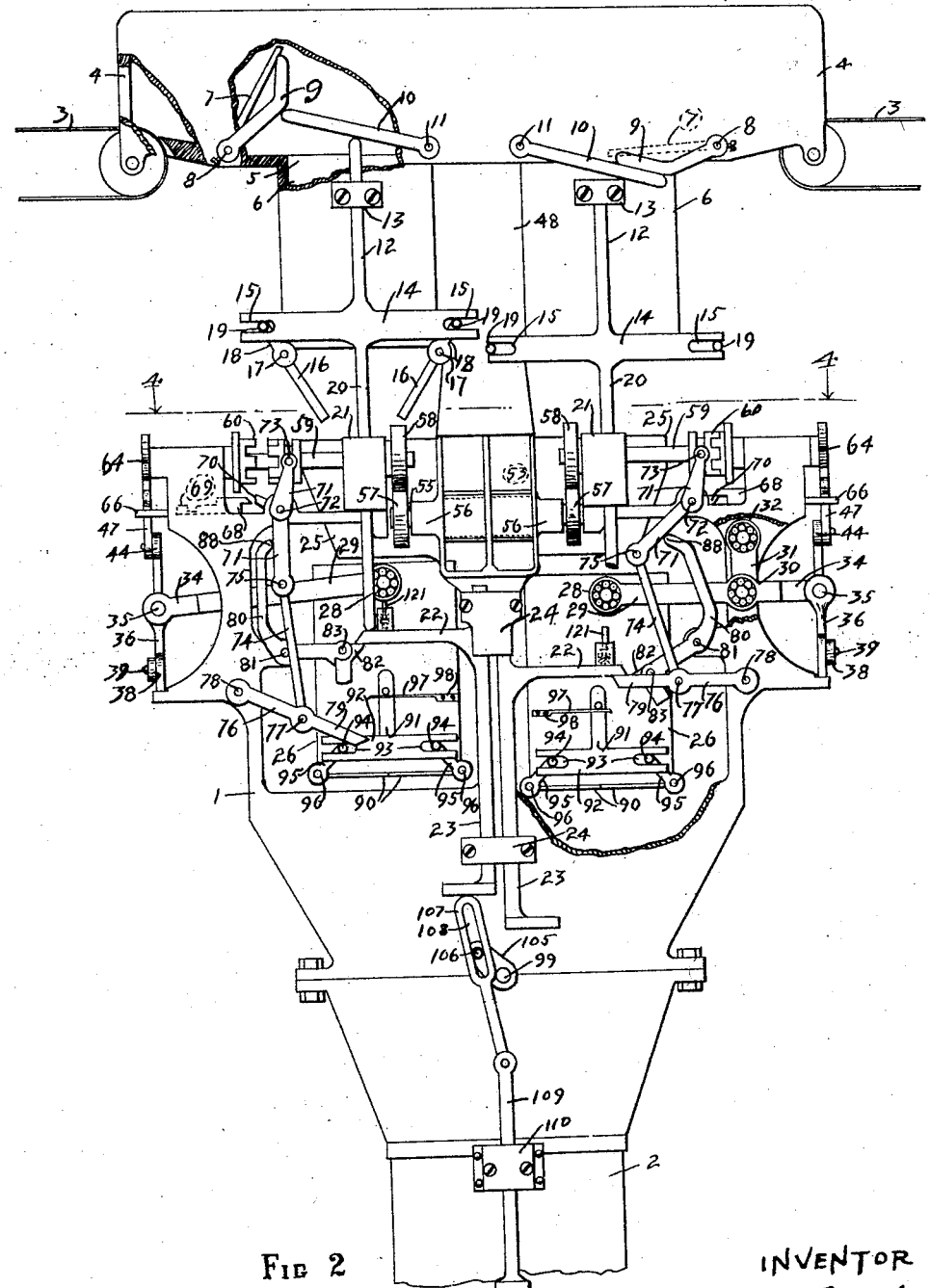
Figure 2 is a side elevation of a pair of the machines adapted to operate alternately.
Figure 6:
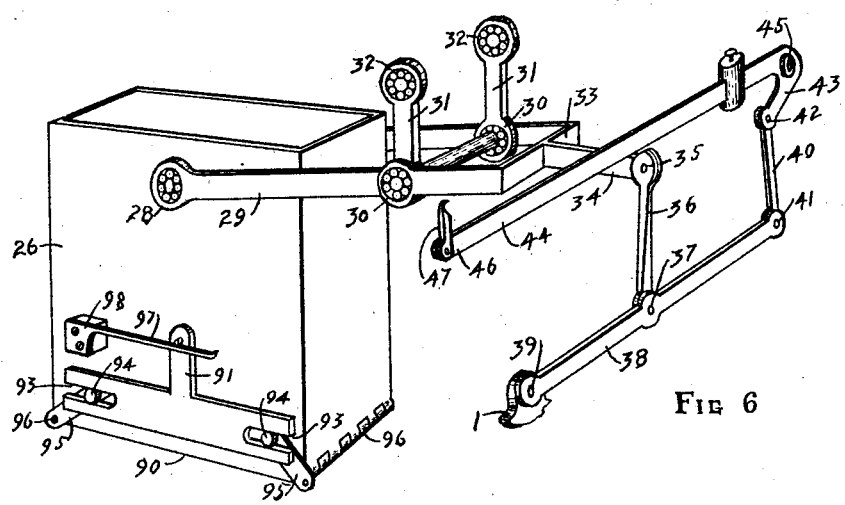
Figure 6 is a perspective view showing one weighing hopper and its connections to the scale beam.
Figure 7:
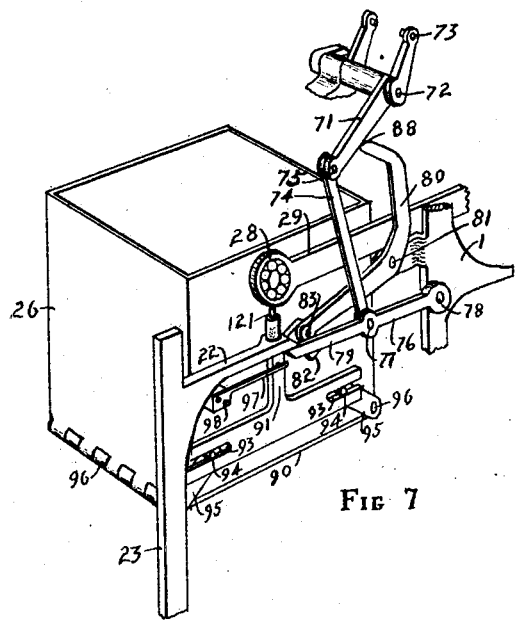
Figure 7 is a perspective illustration showing one weighing hopper and the parts operated thereby for throwing the secondary belt conveyor into and out of operation.

At 99 is a shaft set in chute 2 and carrying a pair of gates 100—101 angularly positioned with relation to each other so as to close off one side of chute 2 at one time; shaft 99 also carries a weight 102 sufficient to hold said gates in alternately closed and open positions and positioned with relation thereto as shown in Figure 8. Stops are shown at 103—104 to prevent gates 100—101 from passing a given position. When material is dropped upon one gate as 100 its weight is sufficient to open the same and drop through to the waiting receptacle, this opening of one gate automatically closing the other gate 101 to receive the material from the other machine. Attached to shaft 99 is an arm 105 carrying a pin 106. At 107 is shown a link provided with a slot 108 adapted to engage pin 106 and pivotally connected at its lower end to a vertically movable rod 109 slidably mounted in bearing 110, the weight of the rod normally maintaining the upper ends of slot 108 in contact with pin 106. These parts are so proportioned and positioned that an upward movement of rod 109 causes link 107 to engage one push rod 23 and force the same upwardly thereby allowing the other rod 23 to descend its full distance and discharge the weighed material in that weigher on gate 101. Immediately upon the conclusion of the upward stroke of rod 109 it falls back to its first position so that as the weighed material strikes gate 101 the said rod is in a position to be swung over under the other rod 23 and to raise the same when forced upwardly by rod 109.

While the machine herein set forth is described as being operated by the plunger of a machine not shown it may be operated as shown in Figure 5 in connection with a series of receptacles as 111 passed thereunder upon a suitable conveyor as 112. In this embodiment a lever is shown at 113 pivoted at 114 with an upwardly projecting foot 115. As a full box engages foot 115 it forces it downward and the long arm of the lever upward, thereby operating one push rod 23. In this embodiment the downward pressure of rod 23 forces rod 109 downwardly against a lever 116 pivoted at 117, spring supported at 118 and carrying an upwardly extending arm 119 normally lying in the path of travel of receptacles 111. The downward pressure of rod 109 removes arm 119 from in front of the receptacle just filled which moves along over roller 120 which rises to its normal position after the receptacle has passed thereover, and detains the next receptacle. The mechanism before described has in the mean time operated to throw link 107 over under the other rod 23 and the operation of lever 113 is repeated.

It is evident that the sudden dropping of a quantity of material approximating the quantity to be weighed out into hopper 26 will tend to force the same down so far that the tripping mechanism will be operated and the material discharged before the desired weight has been obtained. In order to prevent the premature operation of the tripping mechanism I have set a spring supported pin 121 on arm 22 as shown and in such a position that upon a sudden downward movement of hopper 26 the pivoted end 28 of lever 29 will engage said pin 121 and be promptly returned to its proper position by the reaction of said pin on its spring 122, without permitting it to drop far enough to operate the said tripping mechanism.

It is understood of course that changes in construction and operation may be made within the scope of the appended claims, the embodiment shown and described being illustrative only.

I claim:—

1. A weighing machine comprising a feeding mechanism, a receiver for material carried thereby, means for interrupting the flow of material into said receiver at predetermined intervals, a weighing hopper, means for depositing material from said receiver in said hopper at predetermined intervals, means for feeding a small additional amount of material into said hopper, a scale supporting said hopper, means operated by said scale for stopping said feeding means when actuated by the weighed material, and means for discharging the material from said hopper when the scale is operated by the material therein and a reciprocating element operatively mounted to control said first, second, third and fifth mentioned means.

2. A weighing machine comprising a feeding mechanism, a receiver for material carried thereby, means for interrupting the flow of material into said receiver at predetermined intervals, a scale, a hopper supported thereby to receive material from said receiver, means for depositing material from said receiver in said hopper at predetermined intervals, means for preventing the operation of said scale by the depositing of material into said hopper, means for feeding a small additional amount of material into said hopper, means for stopping the operation of said feeding means when the weight of the said material operates said scale, and means for discharging the material from said hopper when the scale is operated by the depositing of the required net weight in said hopper and a reciprocating element operatively mounted to control said first, second, third, fourth, and sixth mentioned means.

3. A weighing machine comprising a feeding mechanism, a receiver for material carried thereby, means for receiving the overflow from said receiver, means for interrupting the flow of material into said receiver at predetermined intervals, a weighing hopper, means for depositing material from said receiver in said hopper at predetermined intervals, means for feeding a small amount of said overflow into said hopper, means operated by said scale for stopping said feeding means when actuated by the weighed material, and means for discharging the material from said hopper when the scale is operated by the material therein and a reciprocating element operatively mounted to control said second, third, fourth and sixth mentioned means.

4. A weighing machine comprising a continuously feeding mechanism, a receiver for material carried thereby, a scale, a weighing hopper mounted thereon to receive material from said receiver, a reciprocating device, means operable by said reciprocating device when moving in one direction for interrupting the flow of material into said receiver and discharging the material therein into said hopper, and means operable by said device when moving in the opposite direction for discharging material from said hopper.

5. A weighing machine comprising a continuously feeding mechanism, a receiver for material carried thereby, a scale, a weighing hopper mounted thereon to receive material from said receiver, means for feeding an additional amount of material into said hopper, a reciprocating device operatively mounted with relation to said receiver and hopper, means operable by said device when moving in one direction for interrupting the flow of material into said receiver and discharging the material therein from said receiver into said hopper, means operable by said device when moving in the opposite direction for rendering said additional feeding means operative and locking said device in a given position with relation to said scale, means operable by the further movement of said device in the last mentioned direction for rendering said additional feeding means inoperative, and means operable by the still further movement of said device in the last mentioned direction for discharging material from said hopper.

6. A weighing machine comprising a continuously feeding mechanism, a receiver for material carried thereby, a scale, a weighing hopper mounted thereon to receive material from said receiver, means for feeding an additional amount of material into said hopper, a supporting member, a reciprocating device operatively mounted with relation to said receiver, hopper and supporting member, means operable by said device when moving in one direction for interrupting the flow of material into said receiver and discharging the material therein into said hopper, means operable by the return movement of said device for rendering said additional feeding mechanism operative and actuating said supporting member into contact with said device, locking connections between said last mentioned means and said scale to hold said supporting member in contact with said device, means for unlocking said connection upon the operation of said scale thereby releasing said supporting member and rendering said additional means inoperative and means operable by the further movement of said device in said last mentioned direction for discharging material from said hopper.

7. A weighing machine including a frame, a scale operatively mounted thereon, a hopper suspended in said frame and operatively mounted to actuate said scale, means for depositing material in said hopper, means for depositing additional material in said hopper to secure a predetermined net weight, a reciprocating device, and means operable successively by said device when moving in one direction for rendering said means for depositing additional material operative, for rendering said means for depositing additional material inoperative and for discharging material from said hopper.

8. A weighing machine comprising a pair of units, each unit comprising a continuously feeding mechanism, a receiver for material carried thereby, a scale, a weighing hopper mounted thereon to receive material from said receiver, an arm operatively mounted to reciprocate vertically adjacent said receiver, means operated by said arm when moving upwardly for interrupting the flow of material into said receiver and discharging material therefrom into said hopper, and means operated by the downward movement of said arm for discharging material from said hopper, the arms of the two units being mounted to operate in parallel relation and adjacent to each other, a selective means adjustable by the material discharged from said hoppers for alternately actuating said arms, and means for operating said selective means.

9. A weighing machine comprising a frame, a scale operatively mounted thereon, a hopper suspended in said frame and operatively mounted to actuate said scale, means for depositing an approximately correct amount of material to be weighed in said hopper, means for preventing the operation of said scale by the impact of said material in said hopper, means for gradually adding material to the contents of said hopper until a given net weight is secured, means released by the action of said scale for stopping the flow of said additional material when said net weight is secured, means for discharging the material from said hopper, and means for rendering said means for gradually adding material to the contents of said hopper operative at a time immediately succeeding the depositing of the approximately correct amount of material therein.

10. A weighing machine including a frame, a scale operatively mounted thereon, a trigger carried by said scale and rendered operative or inoperative thereby, a hopper suspended in said frame and operatively mounted to actuate said scale, means for depositing an approximately correct amount of material to be weighed in said hopper, means for gradually adding material to the contents of said hopper, means for rendering said second mentioned means operative at a time immediately succeeding the deposit of said approximately correct amount of material in said hopper, trigger operated means for locking the same in an operative position, and means for operating said trigger to unlock said trigger operated means when said trigger is moved into an operative position by the action of said scale thereby rendering said second mentioned means inoperative.

11. A weighing machine including a frame, a scale operatively mounted thereon, a hopper suspended in said frame and operatively mounted to actuate said scale, means for depositing material in said hopper, means for depositing additional material in said hopper to secure a predetermined net weight, a reciprocating device, means operable successively by said device when moving in one direction for rendering said means for depositing additional material operative, for rendering said means for depositing additional material inoperative and for discharging material from said hopper, and scale controlled mechanism for locking said device in a given position during the operation of said means for depositing additional material in said hopper.

12. A weighing machine including a frame, a scale operatively mounted thereon, a hopper suspended in said frame and operatively mounted to actuate said scale, means for depositing material in said hopper, a reciprocating device, means operable successively by said reciprocating device when moving in one direction for rendering said means for depositing additional material operative, for rendering said means for depositing additional material inoperative, for discharging material from said hopper, and means carried by said reciprocating device for preventing the operation of said scale by the impact of said material in said hopper.

13. A weighing machine comprising a frame, a scale beam pivotally mounted thereon and carrying a tripping finger, a hopper suspended in said frame and operatively connected to said scale beam, means for depositing an approximately correct amount of material in said hopper, means for depositing additional material in said hopper to operate said scale beam, a reciprocating device, means operable in succession by said device for rendering said first mentioned depositing means inoperative, for rendering said means for depositing additional material operative, for rendering said means for depositing additional material inoperative, and for discharging material from said hopper, means for supporting said reciprocating device in a given position during the operation of said means for depositing additional material in said hopper, means for actuating said tripping finger upon the operation of said scale, and means operable by said tripping finger for releasing said supporting means.

14. A weighing machine including a scale, a hopper operatively mounted thereon to actuate the same, means for depositing an approximately correct amount of material in said hopper, means for depositing an additional amount of material therein to secure a given net weight, a tripping finger on said scale, a tripper element mounted to revolve adjacent said finger and engage the same when said scale is operated, and means operated by said finger when engaged by said tripper element for rendering said additional feeding means inoperative.

15. A weighing machine including a scale, a hopper operatively mounted thereon to actuate the same, means for depositing an approximately correct amount of material in said hopper, shaft operated means for depositing an additional amount of material therein to secure a given net weight, a tripping finger on said scale, a tripper element mounted on said shaft to revolve adjacent said finger and engage the same when said scale is operated, and means operated by said finger when engaged by said tripper element for rendering said additional feeding means inoperative.

16. A weighing machine including a scale, a hopper operatively mounted thereon to actuate the same, means for depositing an approximately correct amount of material in said hopper, shaft operated means for depositing an additional amount of material therein to secure a given net weight, a clutch on said shaft, a tripping finger on said scale, a tripper element mounted on said shaft to revolve adjacent said finger and engage the same when the said scale is operated, and means operated by said finger when engaged by said tripper element for disengaging said clutch and thereby rendering said additional feeding means inoperative.

17. A weighing machine including a frame, a scale operatively mounted thereon, a hopper, means operatively mounted with relation to said scale for suspending said hopper in said frame, means for depositing an approximately correct amount of material in said hopper, a reciprocating device, means operable successively by said reciprocating device when moving in one direction for rendering said depositing means inoperative, and resilient means carried by said reciprocating device for engaging said suspending means and thereby preventing the operation of said scale by the impact of material in said hopper.

18. A weighing machine comprising a pair of units, each unit comprising a receiver for material to be weighed, a scale, a weighing hopper mounted thereon to receive material from said receiver, an arm operatively mounted to reciprocate vertically adjacent said receiver, means operated by said arm when moving upwardly for interrupting the flow of material into said receiver and discharging material therefrom into said hopper, means operated by the downward movement of said arm for discharging material from said hopper, the arms of the two units being mounted to operate in parallel relation and adjacent to each other, a selective mechanism operatively mounted with relation to said arms, and means actuated alternately by the material discharged from said hoppers for adjusting said selective mechanism with relation to said arms.

19. In a weighing machine including a scale, a hopper mounted to actuate the same, and means for depositing an approximately correct amount of material in the hopper, of a rotatable shaft, a tripper element on said shaft, means for depositing an additional amount of material in said hopper operatively mounted with relation to said shaft means operating independently of said scale for rendering said additional feeding means operative, and means rendered operative by said tripper element and said scale when operated for rendering said additional feeding means inoperative.

ALBERT REYNOLDS.